(12) United States Patent
St-Germain et al.

(10) Patent No.: US 12,037,058 B2
(45) Date of Patent: Jul. 16, 2024

(54) STEERING SYSTEM FOR AN AUTOMATED VEHICLE

(71) Applicant: Bombardier Transportation GmbH, Berlin (DE)

(72) Inventors: Benoît St-Germain, Notre Dame De L'Ile Perrot (CA); Martin Houle, Laval (CA); Benoit Lussier, Ste-Julie (CA); Sylvie Houle, St-Bruno (CA); Claude Tessier, Sainte-Adele (CA); David Lortie, Laval (CA)

(73) Assignee: Bombardier Transportation GmbH, Berlin (DE)

( * ) Notice: Subject to any disclaimer, the term of this patent is extended or adjusted under 35 U.S.C. 154(b) by 700 days.

(21) Appl. No.: 17/124,585

(22) Filed: Dec. 17, 2020

(65) Prior Publication Data
US 2021/0188345 A1 Jun. 24, 2021

Related U.S. Application Data

(60) Provisional application No. 62/951,414, filed on Dec. 20, 2019.

(51) Int. Cl.
*B62D 5/00* (2006.01)
*B62D 5/04* (2006.01)
(Continued)

(52) U.S. Cl.
CPC ......... *B62D 5/0463* (2013.01); *B62D 5/0418* (2013.01); *B62D 5/20* (2013.01); *B62D 7/228* (2013.01)

(58) Field of Classification Search
CPC ...... B62D 5/0463; B62D 5/0418; B62D 5/20; B62D 7/228; B62D 5/003; B62D 7/159;
(Continued)

(56) References Cited

U.S. PATENT DOCUMENTS 3,011,992 A   12/1961  Anderson
6,015,193 A   1/2000   Vogel et al.
(Continued)

FOREIGN PATENT DOCUMENTS

CN   107650678 A   2/2018
EP   0999117 A2    5/2000
(Continued)

OTHER PUBLICATIONS

"Control Engineering Staff, ABB releases next generation System 800xA high integrity safety system, Feb. 4, 2019, Control Engineering" (Year: 2009).*

(Continued)

*Primary Examiner* — Tiffany P Young
(74) *Attorney, Agent, or Firm* — The Webb Law Firm

(57) ABSTRACT

An autonomous vehicle for passengers includes four steerable wheels where each steerable wheel is steered by a steering system having a set of two actuators. One actuator of each set of actuators is powered by a first power source while the other actuator of the set of powered by a second power source. Four controllers each control one actuator of each set of actuators and one actuator from another set of actuators.

8 Claims, 6 Drawing Sheets

(51) Int. Cl.
*B62D 5/20* (2006.01)
*B62D 7/22* (2006.01)

(58) Field of Classification Search
CPC .......... B62D 5/001; B62D 5/04; B62D 5/062; B62D 5/0481; B62D 5/0484; B62D 5/0487; B62D 5/049; B62D 5/0493; B62D 5/0496; B62D 6/06; B62D 9/002; B62D 7/22; B62D 7/222
See application file for complete search history.

(56) References Cited

U.S. PATENT DOCUMENTS

| | | | |
|---|---|---|---|
| 7,726,436 B2 | 6/2010 | Pfeiffer et al. | |
| 11,370,475 B1* | 6/2022 | Katzourakis | B62D 15/025 |
| 2013/0345915 A1* | 12/2013 | Chae | B62D 5/003 |
| | | | 701/22 |
| 2015/0175203 A1* | 6/2015 | Suh | B62D 9/002 |
| | | | 701/22 |
| 2015/0307128 A1* | 10/2015 | Blond | B62D 5/20 |
| | | | 701/42 |
| 2016/0096550 A1* | 4/2016 | Dames | B62D 7/142 |
| | | | 280/86.758 |
| 2016/0362102 A1* | 12/2016 | Honda | B60W 10/20 |
| 2017/0267275 A1* | 9/2017 | Engels | B62D 5/003 |
| 2017/0282971 A1 | 10/2017 | Yanez | |
| 2020/0070872 A1* | 3/2020 | Ushiro | B62D 5/04 |
| 2020/0079167 A1* | 3/2020 | Brenner | B62D 7/06 |
| 2021/0016824 A1 | 1/2021 | Ishige et al. | |
| 2021/0016825 A1* | 1/2021 | Miura | B62D 6/003 |
| 2021/0155290 A1* | 5/2021 | Chen | B62D 7/166 |
| 2021/0276614 A1* | 9/2021 | Laine | B62D 5/0463 |

FOREIGN PATENT DOCUMENTS

| | | |
|---|---|---|
| EP | 2759458 A1 | 7/2014 |
| WO | 2005047080 A1 | 5/2005 |
| WO | 2015054760 A1 | 4/2015 |
| WO | 2019224873 A1 | 11/2019 |

OTHER PUBLICATIONS

"Drives and Controls, High-integrity controller brings it all together, Mar. 1, 2005, Drives and Controls" (Year: 2005).*

* cited by examiner

STEERING SYSTEM FOR AN AUTOMATED VEHICLE

CROSS-REFERENCE TO RELATED APPLICATION

This application claims priority to U.S. Provisional Patent Application No. 62/951,414 filed Dec. 20, 2019, the disclosure of which is hereby incorporated by reference in its entirety.

FIELD OF THE INVENTION

The present invention generally relates to the field of autonomous vehicles. More specifically, the invention relates to a steer-by-wire steering system for an autonomous vehicle having a high level of redundancy and integrity.

BACKGROUND OF THE INVENTION

Steer-by-wire steering systems are increasingly used in the automotive field, especially with the rise of autonomous vehicles. Such steer-by-wire typically use sensors detecting a rotation of a steering wheel and send a signal representing this detected rotation to an actuator acting on a steering rack connecting steered wheels.

In other types of autonomous vehicles, another version of the steer-by-wire system is used where a separate steering actuator is assigned to each steerable wheel of the autonomous vehicle. This variation allows an independent control of a steering angle of each steerable wheel. Advantageously, such a steer-by-wire system may orient the steerable wheels either according to the Ackermann principle or to allow crabbing movement of the vehicle when all wheels are steered parallelly.

As is often the case with product design, one of the objectives is often to keep the cost of the vehicle as low as possible such that the number of sensors and actuators in both of these designs is kept to an acceptable minimum. However, in some other types of autonomous vehicles, such as those used in the mass transit market, higher safety levels are required where the automotive safety levels are not sufficient and where the above described steer-by-wire systems may not be capable of meeting safety requirements which often require higher availability and integrity. There is therefore a need for autonomous mass-transit vehicles meeting more stringent safety requirements.

SUMMARY OF THE INVENTION

It is an object of the present invention to provide a steering system for an autonomous vehicle that overcomes or mitigates one or more disadvantages of known steering systems for autonomous vehicles, or at least provides a useful alternative.

The present invention provides the advantage of meeting safety requirements for at least some categories of autonomous mass-transit vehicles.

In accordance with an embodiment of the present invention, there is provided an autonomous vehicle comprising a body having a passenger compartment, four steering systems, at least two controllers, a first power source and a second power source. Each steering system is equipped with a wheel and a first actuator connecting the wheel to the body for steering the wheel. Each one of the four wheels supports a different end and a different side of the body. The at least two controllers are operatively connected to the first actuators for controlling their actuation. The first power source powers a first subset of the first actuators while the second power source powers a second subset of the first actuators.

Optionally, the four steering systems of the autonomous vehicle may be a front right steering system, a front left steering system, a rear right steering system and a rear left steering system. The autonomous vehicle may further comprise coupling links respectively between the front right steering system and the front left steering system and between the rear right steering system and the rear left steering system. The coupling links are operative to respectively transfer a steering movement from a first one of the coupled steering systems to a second one of the coupled steering systems.

Optionally, each one of the coupling links may comprise a spring element and a damping element where each spring element allows a difference in steering angle between the wheels of the respective coupled steering system. The coupling link may be one of a mechanical or a hydraulic coupling link.

Alternatively, the four steering systems of the autonomous vehicle may be a front right steering system, a front left steering system, a rear right steering system and a rear left steering system. The autonomous vehicle may further comprise coupling links respectively between the front right steering system and the rear right steering system and between the front left steering system and the rear left steering system.

Optionally, each one of the coupling links may comprise a spring element and a damping element where each spring element allows a difference in steering angle between the wheels of the respective coupled steering system. The coupling link may be one of a mechanical or a hydraulic coupling link.

Alternatively, each one of the four steering systems may further comprise a second actuator and one controller. The second actuator also connects the wheel to the body for steering the wheel. Each controller is operatively connected to the first actuator of its respective steering system and to one of the second actuators of another steering system. The first power source powers a first subset of the second actuators while the second power source powers a second subset of the second actuators.

Optionally, each second actuator may act on its respective wheel in opposition to the first actuator of the respective steering system.

Alternatively, each second actuator may act on its respective wheel in parallel to the first actuator of the respective steering system.

The first and the second actuators may be hydraulic actuators, in which case the first and the second power sources would be hydraulic pumps. Alternatively, the first and second actuators may be electro-mechanical actuators, in which case the first and the second power sources would be electrical power sources.

Optionally, the controllers may be organized in two pairs. Each pair of controllers control two of the four steering systems located at a different end of the body.

Optionally, the controller of each steering system may be connected in active mode to the first actuator of the respective steering system, while being connected in passive mode to one of the second actuators of a different one of the four steering systems.

Optionally, the first actuators and the second actuators of each steering system may operate in active-active mode. In this case, each controller of each steering system further comprises a force-fight compensation system adapted to adjust one of a stroke and a force of at least one of the first actuator and the second actuator of their respective steering systems.

Optionally, the controllers may be high-integrity controllers.

BRIEF DESCRIPTION OF DRAWINGS

These and other features of the present invention will become more apparent from the following description in which reference is made to the appended drawings wherein.

DETAILED DESCRIPTION OF THE INVENTION

Figure 1:
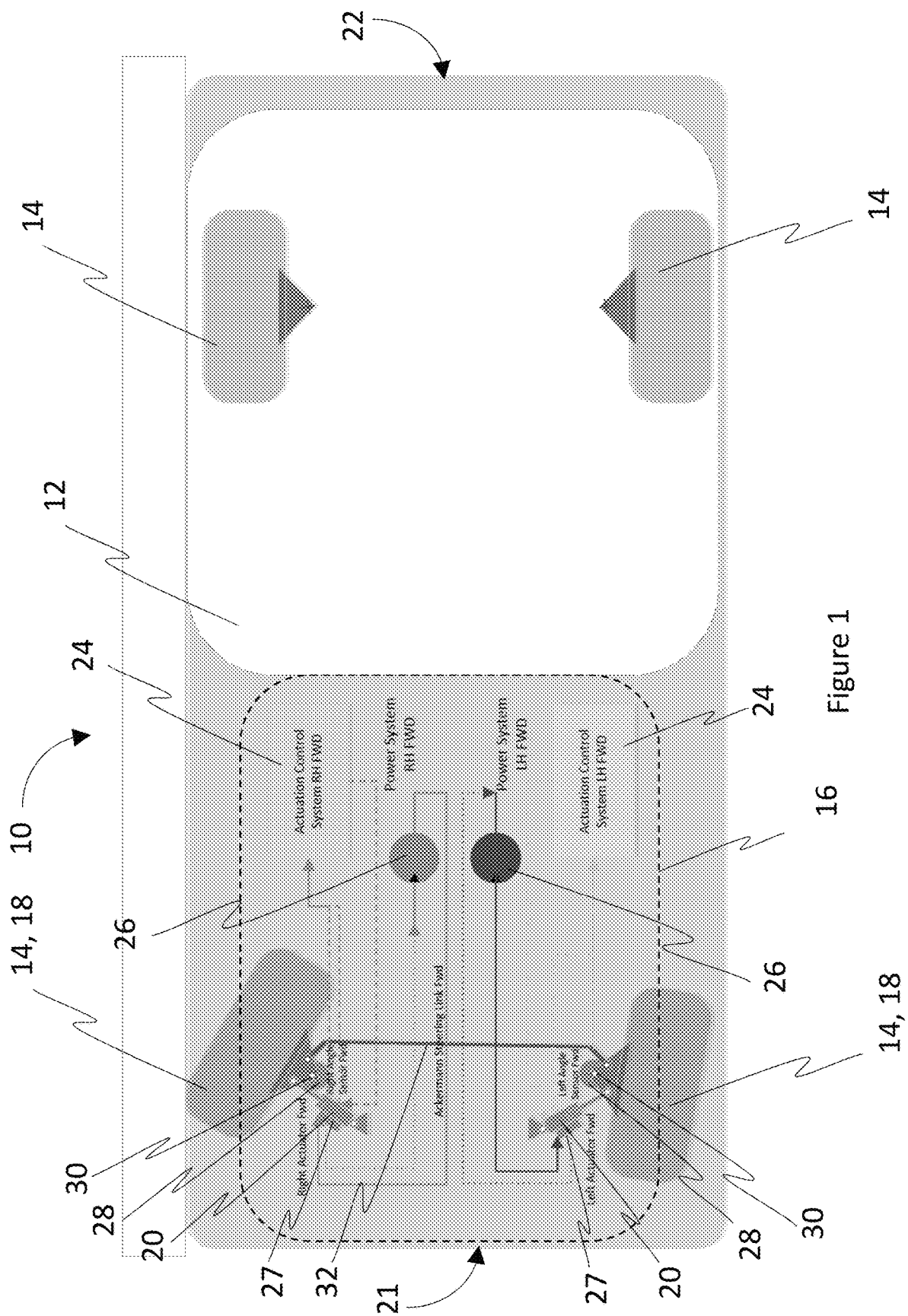
FIG. 1 is a schematic diagram of a first concept of a steering system in accordance with an embodiment of the present invention.

FIG. 1 schematically depicts a first embodiment of the present invention. An autonomous vehicle 10 typically comprises a body 12 having a passenger compartment for transporting passengers. The vehicle 10 comprises at least four wheels 14, each supporting a different end and a different side of the body as well as a steering system 16 for steering steerable wheels 18.

A command to steer the autonomous vehicle 10 may either come from a main vehicle controller which either detects that steering is required, or which uses a memorized path and sends a command to steer accordingly. Alternatively, the autonomous vehicle 10 could be remote controlled and receive the steering command remotely.

The steering system 16 of the instant embodiment steers two steerable wheels 18 through two actuators 20. Each actuator 20 is connected at one end to the body 12 and at its moveable end to a different one of the steerable wheels 18. In the present embodiment, the steerable wheels 18 are solely located at a front 21 of the vehicle 10. The wheels 14 located at a back 22 of the vehicle 10 are non-steerable. It should be noted that the front 21 and the back 22 of the vehicle 10 could be inverted without departing from the present invention.

Steerable wheels 18 are typically organized in pairs on a common "axle". Although there is clearly no axle used in the present embodiment, that term will nevertheless be used to denote two corresponding wheels located at a common longitudinal distance in the vehicle 10, but on two different sides of the vehicle 10.

Each actuator 20 is independently controlled by a controller 24 and independently powered by its own power source 26. The actuators 20 may either be hydraulic, in which case the power source 26 is a hydraulic pump, or electro-mechanic, in which case the power source 26 is electric. The actuators 20 may be linear or rotational. In case of failure, each actuator 20 may be back driven.

Upon receiving the steering command, for example, by the main vehicle controller, each controller 24 independently connected to one actuator 20 is operative to send a signal to its respective actuator 20 that is indicative of a stroke to reach. In turn, this stroke corresponds to a desired steering angle of that steerable wheel 18. The controller 24 therefore sends a signal to the actuator 20 to which it is connected that is proportional to the desired steering angle. Each actuator 20 may be equipped with its own stroke sensor 27 operative to send back a signal (a stroke reading) to its controller 24, indicative of the stroke it has reached. This creates a feedback loop allowing the controller 24 to readjust its command in case the actuator 20 has not reached the desired stroke. Moreover, angle sensors 28 may be installed in proximity to a steering pivot 30 of each steerable wheel 18 to monitor the actual steering angle of its respective steerable wheel 18. Typically, each angle sensor 28 also feeds its actual steering angle reading to its respective controller for monitoring. If the controller 24 detects a significant discrepancy between the actual angle reading and a theoretical angle yielded by the stroke read by the stroke sensor 27, then the controller 24 may decide on a mitigating action, such as switching the actuator 20 in passive mode, or stopping the vehicle by communicating a request to the main vehicle controller. In the present document, the expression "controlling in Passive mode" shall be interpreted as switching one actuator in Passive mode, that is letting this actuator being back-driven.

In the present description, and in all embodiments of the invention, the one or many controllers 24 may be of the high-integrity type. High integrity types of controllers 24 further add to the integrity of the whole system.

In the present embodiment, redundancy is provided by a steering link 32 connecting both steerable wheels 18. It is used as a redundant steering means in case one of the actuators 20 fails. Because each steerable wheel 18 is independently controlled, their steering angle may be slightly different. However, in normal operation, this steering angle will follow the Ackermann principle so an Ackermann geometry may be built in the steering link 32. According to the Ackermann geometry, in a turn, the inner wheel steers more than the outer wheel. In this case, the steering link 32 comprises a steering rod and two steering arms, one connected to each steerable wheel 18. In other cases, however, and as will be further discussed below, it may be desirable for the steered wheels 18 to acquire a parallel toe angle. To accommodate this, the steering link 32 is designed with free play so that the steered wheels 18 may steer either parallel to each other or with an Ackermann angle in between them. This free play insures a certain independence of steering of the corresponding steered wheels 18 on a common axle. If one of the actuators 20 fails, the steered wheel 18 on the failed side may want to steer in a totally unpredictable manner. To prevent this, a predetermined threshold of angle difference between both steerable wheels 18 of a common axle is designed in the steering link 32. This predetermined threshold may correspond to the end of the free play in the steering linkage. Passed this threshold, the steering link 32 acts as a solid linkage and couples both steerable wheels 18. To achieve this, the steering link 32 may be equipped with one or both of a resilient spring element and a damping element. The steering link 32 may either be a mechanical link or a hydraulic connection between the steerable wheels 18. For light vehicles, a pneumatic connection could even be considered.

To provide even further redundancy, the steering link 32 could be dualized, that is two steering links 32 may be used in combination to both steer the steerable wheels 18 to which they are attached. For example, the steering links 32 may be attached one atop the other or in some appropriate way. They may be concentric rods or placed side-by-side. Under some circumstances, it may even be appropriate to use such dualized steering links 32 and to remove one of the actuators 20 driving one of the steerable wheels 18 to which the steering links 32 are attached. In case of failure of one steering link 32, the other steering link 32 is still sufficient to transfer steering movement between both steerable wheels 18 to which it is attached. This would however be to the detriment of the integrity of the system since there would be no way to steer the steerable wheels 18 in case of failure of the only remaining actuator 20.

Figure 2:
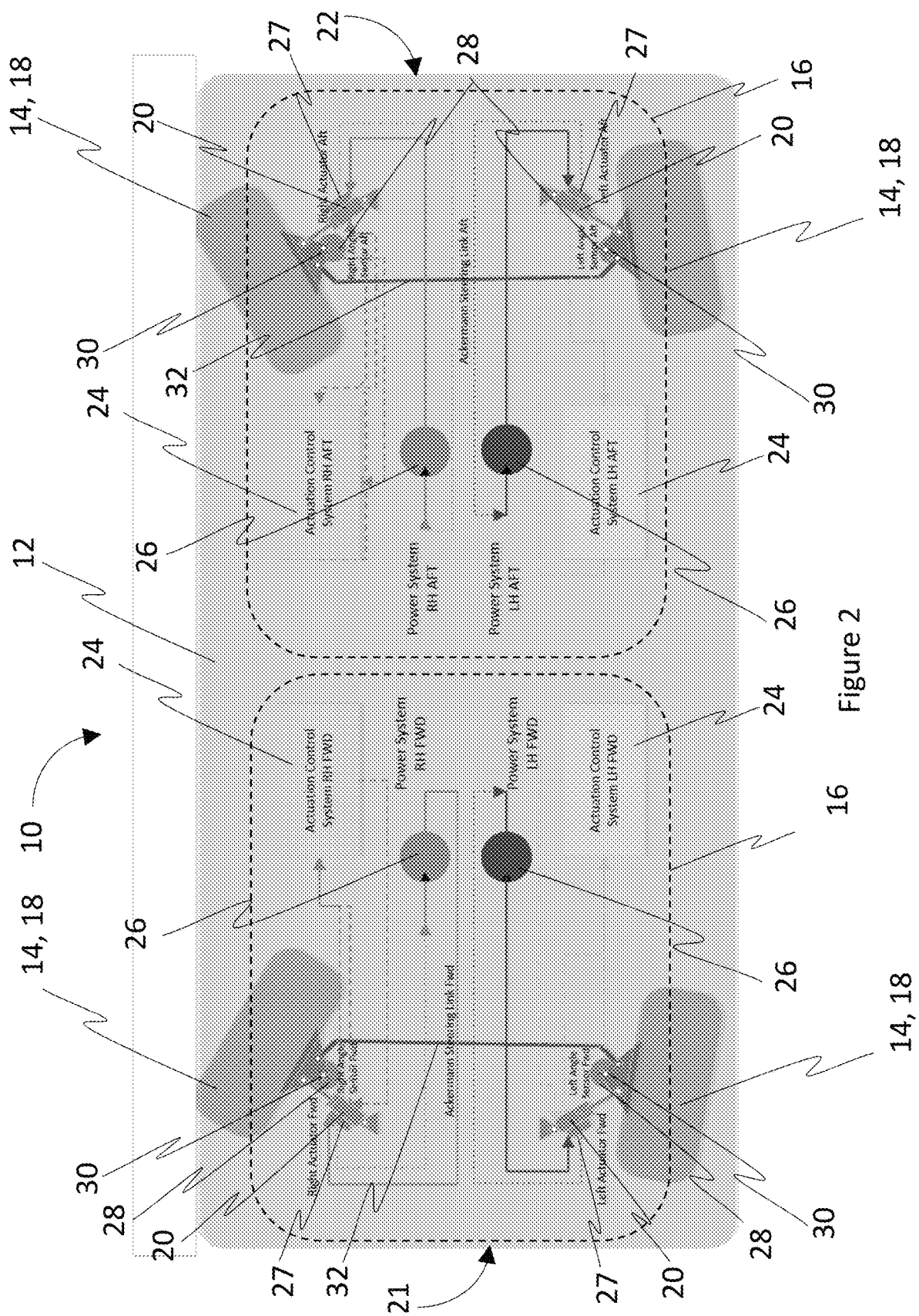
FIG. 2 is a schematic diagram of a second concept of a steering system in accordance with an embodiment of the present invention.

Optionally, a second steering system 16, similar to the one used at the front 21 of the vehicle 10, may be used at the back 22 of the vehicle. This embodiment is depicted in FIG. 2, now concurrently referred to. In this embodiment, all four wheels 14 of the vehicle 10 are steerable. Similarly to the steerable wheels 18 of the front axle, the steerable wheels 18 of the rear axle are steered independently, each being steered through their own actuator 20 controlled by their own controller 24. As can be seen in FIG. 2, the exact same steering system architecture is used at the rear of the vehicle 10 as at the front of the vehicle and works exactly the same way. The rear steering system 16 will therefore not be further described here.

This four-wheel steering system however provides an advantage over that of the two-wheel steering system: the crabbing capacity (also known as Dog Tracking). Crabbing happens when the vehicle 10 moves sideways at an angle. This maneuver may be induced by steering all wheels 14 at the same angle. This capacity is useful when, for example, the vehicle 10 is required to dock along a platform, for example to embark or disembark passengers.

Figure 3:
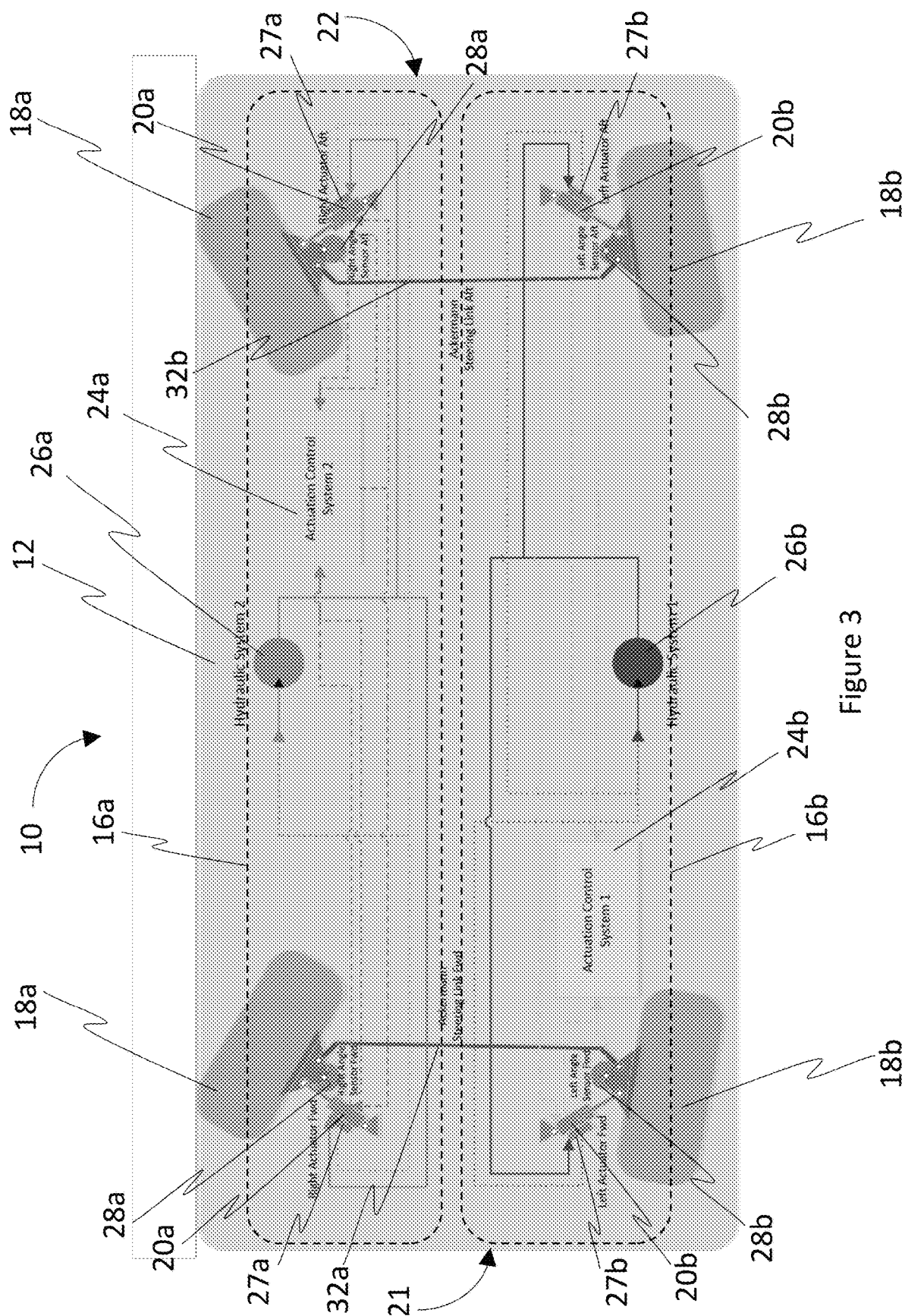
FIG. 3 is a schematic diagram of a third concept of a steering system in accordance with an embodiment of the present invention.

A variant of this design still provides some level of redundancy while using less components (and is therefore arguably cheaper to manufacture). This embodiment is depicted in FIG. 3, now concurrently referred to. This embodiment is similar to the previous embodiment depicted in FIG. 2, except that only two controllers 24 and two power sources 26 are used instead of four of each. Each controller 24 is linked to two steered wheels 18 located on the same side of the body 12. Hence, one controller 24a controls the steering of the right steerable wheels 18a by being connected to the right actuators 20a while the other controller 24b controls the steering of the left steerable wheels 18b by being connected to the left actuators 20b. Both right stroke sensors 27a are connected to the controller 24a for providing feedback on the stroke of the front right and rear right actuators 20a. Both right angle sensors 28a are also connected to the right controller 24a for providing feedback on the steering angle of the front right and rear right steerable wheels 18a. Similarly, both left stroke sensors 27b are connected to the left controller 24b for providing feedback on the stroke of the front left and rear left actuators 20b. Both left angle sensors 28b are also connected to the left controller 24b for providing feedback on the steering angle of the front left and rear left steerable wheels 18b. The right and left controllers 24a, 24b are referred to as such not based on their actual location, but rather because they belong respectively to either the right or the left steering system 16a, 16b.

The right power source 26a powers both of the right actuators 20a while the left power source 26b powers both of the left actuators 20b. The right and left power sources 26a, 26b are referred to as such not based on their actual location, but rather because they belong respectively to either the right or the left steering system 16a, 16b. Again, the right and left power sources 26a, 26b may either be hydraulic, in which case the actuators 20 are hydraulic actuators or the right and left power sources 26a, 26b may be electric in which case the actuators 20 are electro-mechanical actuators.

Interestingly, in the present embodiment, it cannot be said that the steering links 32 belong to either the right or left steering systems 16a, 16b since they still connect the right and left steerable wheels 18 on a common axle. In other words, the front steering link 32a connects the front right and front left steerable wheels 18 while the rear steering link 32b connects the rear right and rear left steerable wheels 18.

Figure 4:
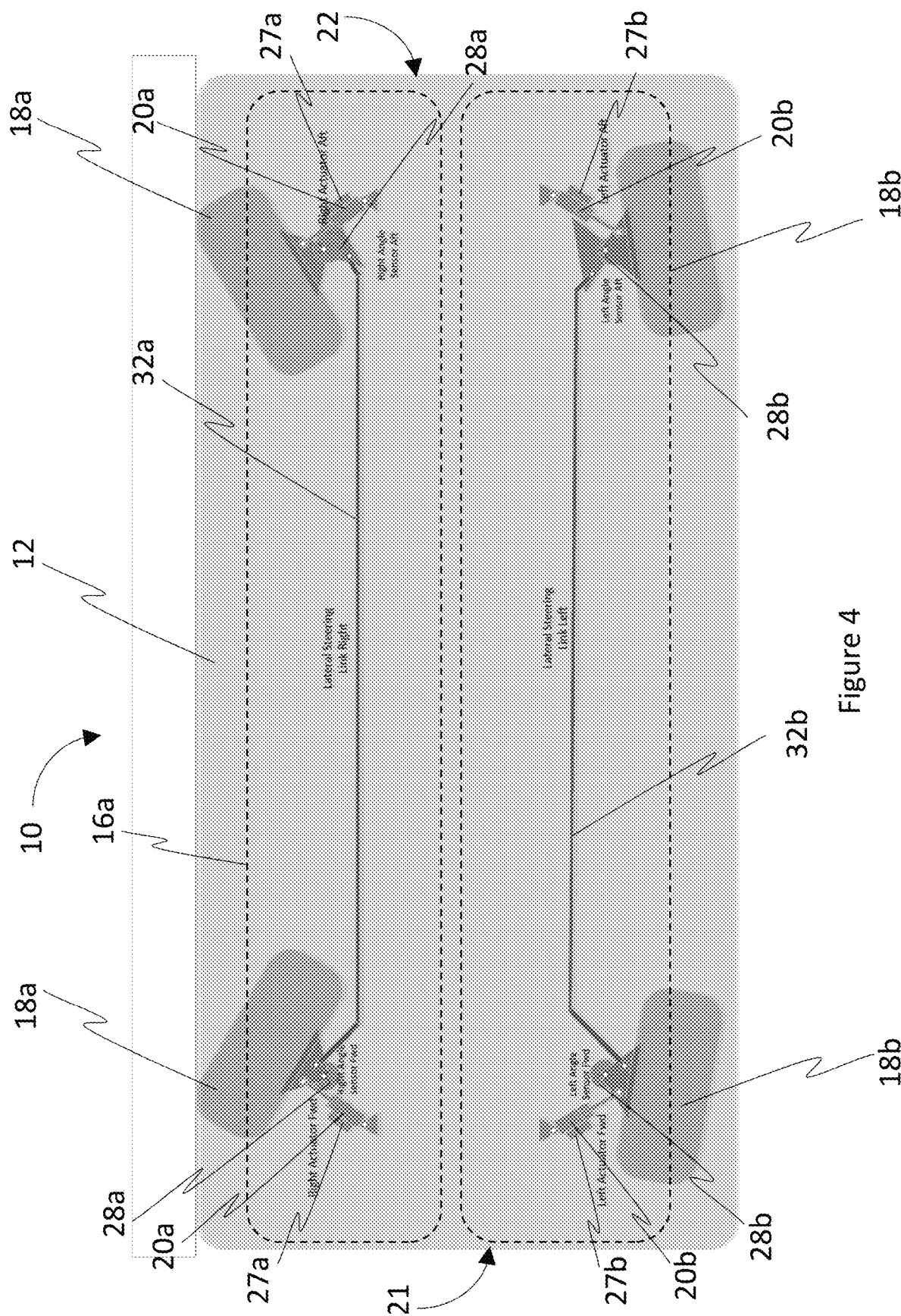
FIG. 4 is a schematic diagram of a fourth concept of a steering system in accordance with an embodiment of the present invention.

FIG. 4 is now concurrently referred to. Alternatively, each steering link 32 could belong to a different one of the steering systems 16a, 16b by having a right steering link 32a connecting the right front steerable wheel 18a to the right rear steerable wheel 18a and a left steering link 32b connecting the left front steerable wheel 18b to the left rear steerable wheel 18b. Note that for clarity reasons, the controllers 24 and the power sources 26 as well as their connections have been omitted to clearly see the steering links 32a, 32b, but that it should be understood that implementations of such controllers 24, power sources 26 and their respective connections may be achieved according to either FIG. 2 or FIG. 3.

Figure 5:
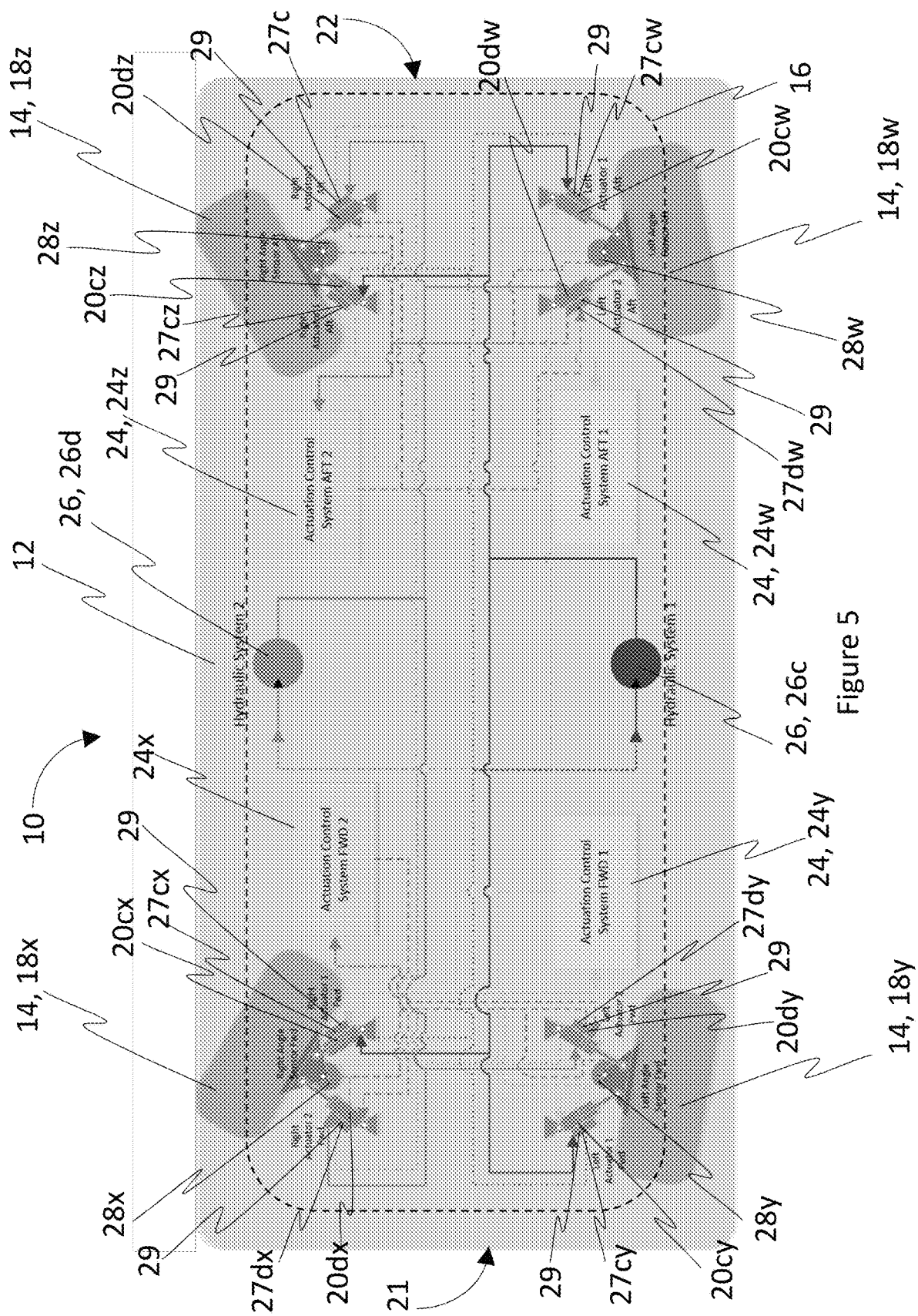
FIG. 5 is a schematic diagram of a fifth concept of a steering system in accordance with an embodiment of the present invention.

In another embodiment of the present invention, the steering links 32 are completely avoided. This embodiment is represented in FIG. 5, now concurrently referred to. The autonomous vehicle 10 of this embodiment comprises four steerable wheels 18 supporting a different end and a different side of the body 12, the steering system 16, four controllers 24 and at least two power sources 26. This steering system 16 is made of four sets of actuators 20, each having a first actuator 20c and a second actuator 20d connected in opposition. Alternatively, the first actuator 20c and the second actuator 20d could also be connected in parallel, one beside the other (not shown). Each set of actuators 20 is connected to a different one of the four steerable wheels 18.

The first power source 26c powers all first actuators 20c, while the second power source 26d powers all second actuators 20d. Again, these power sources 26c, 26d may be a hydraulic pump, when the actuators 20 used are hydraulic actuators or the power sources 26c, 26d may be an electric power source when the actuators 20 used are electro-mechanical actuators. In the present example, the actuators 20 are controlled to work in Active-Passive mode. Active means that the controller is controlled and provides the force to steer the wheel. Passive means that the actuator is not controlled or is not responsive to the command and is simply back driven by the moveable element to which it is attached. Hence, in Active-Passive mode, one actuator provides a force to steer the wheel while the other is being back driven and provides no force. Active-Active mode means that both controllers provide a force to steer the wheel.

Upon receiving the command from the main vehicle controller, each one of the four controllers 24 controls a steering of a different one of the four steerable wheels 18. Each controller 24 is connected in Active mode to the first actuator 20c of the respectively steerable wheel 18 it controls. Each controller 24 may additionally be connected in Passive mode to the second actuator 20d of at least one of the other steerable wheels 18. None of the controllers 24 is connected to both the first actuator 20c and the second actuator 20$d$ of one given steerable wheel 18. This intertwined connection ensures that each controller 24 is in control of a different steerable wheel 18 through its Active connection to the first actuator 20$c$ of that steerable wheel 18 while acting as a back-up controller for at least one other steerable wheel 18 by controlling in Passive mode its second actuator 20$d$, should the controller 24 or the first actuator 20$c$ of that other steerable wheel 18 fail. Stated differently, each controller 24 is assigned to the control of a different steerable wheel 18 and controls two actuators 20: one first actuator 20$c$ steering a first steerable wheel 18 is controlled in Active mode and one second actuator 20$d$ connected to a second steerable wheel 18 is controlled in Passive mode. If, for example, a first controller 24 detects a failure of its Actively controlled first actuator 20$c$ (e.g. as discussed earlier, if there exist a significant discrepancy between the steering angle reading received from the steering angle sensor 28 and the theoretical steering angle yielded by the stroke reading received by the stroke sensor 27), then it can switch its connected first actuator 20$c$ in Passive mode immediately. Simultaneously and in a similar manner, a second controller 24 will be informed of the mode transition of the first controller in Passive mode and will switch this second actuator 20$d$ in Active mode. Transition from one controller to the other must be within an acceptable time threshold to prevent losing control of the vehicle 10.

In the present embodiment, and as an example, controller 24$x$ controls in Active mode the steering of the front right steerable wheel 18$x$ through the first actuator 20$cx$. Controller 24$x$ is also connected in Passive mode to the second actuator 20$dy$ of the front left steerable wheel 18$y$. Controller 24$x$ receives the feedback signals from the stroke sensor 27$cx$ and angle sensor 28$x$ of the steerable wheel 18$x$ as well as from the stroke sensor 27$dy$ and angle sensor 28$y$ of the steerable wheel 18$y$.

Controller 24$y$ controls in Active mode the steering of the front left steerable wheel 18$y$ through the first actuator 20$cy$. Controller 24$y$ is also connected in Passive mode to the second actuator 20$dx$ of the front right steerable wheel 18$x$. Controller 24$y$ receives the feedback signals from the stroke sensor 27$cy$ and angle sensor 28$y$ of the steerable wheel 18$y$ as well as from the stroke sensor 27$dx$ and angle sensor 28$x$ of the steerable wheel 18$x$. The control of both front steerable wheels 18$x$, 18$y$ is therefore interconnected so that one controller 24$x$, 24$y$ acts as a redundant controller for the other one by controlling the second actuator 20$dx$, 20$dy$ of the other controller 24$y$, 24$x$.

Similarly, the rear steerable wheels 18$z$, 18$w$ are also interconnected. Controller 24$z$ controls in Active mode the steering of the rear right steerable wheel 18$z$ through the first actuator 20$cz$. Controller 24$z$ is also connected in Passive mode to the second actuator 20$dw$ of the rear left steerable wheel 18$w$. Controller 24$z$ receives the feedback signals from the stroke sensor 27$cz$ and angle sensor 28$z$ of the steerable wheel 18$z$ as well as from the stroke sensor 27$dw$ and angle sensor 28$w$ of the steerable wheel 18$w$.

Controller 24$w$ controls in Active mode the steering of the rear left steerable wheel 18$w$ through the first actuator 20$cw$. Controller 24$w$ is also connected in Passive mode to the second actuator 20$dz$ of the rear right steerable wheel 18$z$. Controller 24$w$ receives the feedback signals from the stroke sensor 27$cw$ and angle sensor 28$w$ of the steerable wheel 18$w$ as well as from the stroke sensor 27$dz$ and angle sensor 28$z$ of the steerable wheel 18$z$. The control of both rear steerable wheels 18$z$, 18$w$ is therefore interconnected so that one controller 24$z$, 24$w$ acts as a redundant controller for the other one by controlling the second actuator 20$dz$, 20$dw$ of the other controller 24$w$, 24$z$.

These interconnections are only provided as an example and the same level of redundancy may be provided by interconnecting a controller 24 in Passive mode with any one of the wheels to which it is not connected to the first actuator 20 in Active mode. For example, the controller 24$x$ could be connected to any one of the second actuators 20$dy$, 20$dz$ or 20$dw$. The other controllers 24$y$, 24$w$, 24$z$ must also therefore be connected in Passive mode to any one of the other second actuators 20 so that each steerable wheel 18 is controlled in Active mode by one controller 24 and in Passive mode by another controller 24.

In another variant of the present embodiment, the actuators may be controlled in Active-Active mode so that both the first actuator 20$c$ and the second actuator 20$d$ attached to the same steerable wheel 18 may use a force to induce a steering movement to the steerable wheel 18. In this case, the controllers 24 and actuators 20 may be interconnected as previously described, but a force-fight control is added to the controllers 24 so as to prevent having the first and second actuators 20$c$, 20$d$ of a set of actuators force against each other or forcing differently and creating mechanical fatigue. Using the feedback provided by force-fight feedback reduction controller (FFRC) sensors 29 connected to each one of the first and second actuators 20$c$, 20$d$, the controllers 24, using a force-fight reduction algorithm, are capable of reducing the induced additional force created by a possible misalignment of a set of actuators 20, by either adjusting the stroke of or the force applied by one or both actuators 20 so that the steerable wheel 18 to which the set of actuators 20 is connected is steered at the desired angle without additional force being incurred in the actuators 20. This is especially important in the case where the vehicle 10 is a self-propelled electric vehicle which needs to manage properly its battery, which also feeds the power sources 26, in order to maximize its range. Consequently, the following force-fight solution is applied.

When adding the force-fight function to the controller 24, the FFRC sensors 29 are required in the actuators 20. The FFRC sensors 29 may detect one or more of a load, force, pressure or current, depending on the type of actuator 20 used. For each steerable wheel 18, the FFRC sensors 29 of both connected first and second actuators 20$c$, 20$d$ are operative to send the detected signal to both their respective controller 24 as well as to the controller 24 of the other connected actuator. In other words, whereas each steerable wheel 18 is steered by both connected first actuator 20$c$ and second actuator 20$d$, the FFRC sensors 29 of both the first and second actuator 20$c$, 20$d$ send their respective signals to both the controller 24 controlling the first actuator 20$c$ and to the controller 24 controlling the second actuator 20$d$.

Figure 6:
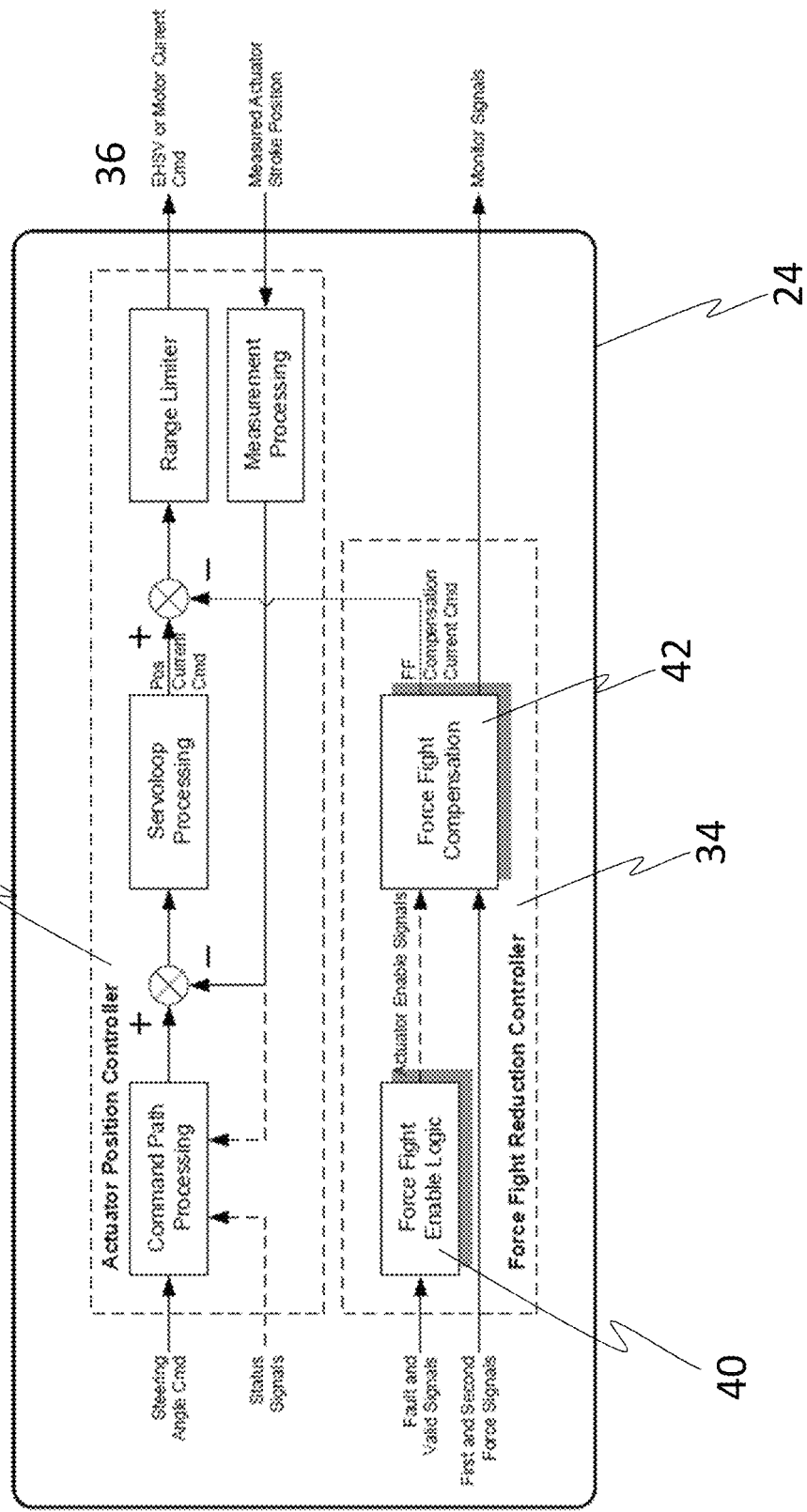
FIG. 6 is a schematic diagram of position and force fight reduction function of an actuator controller in accordance with an embodiment of the present invention.

FIG. 6 is now concurrently referred to. As already mentioned, during operation, the loads supplied by both actuators 20 of a set of actuators acting on a steerable wheel 18 may not be equal or acting in the same direction. A force-fight reduction controller 34, which may be implemented in each individual controller 24, implements a so-called force-fight limiting compensation function whose goal is to equalize the load share between all active actuators 20 acting on a given steerable wheel 18 to less than a percentage of the actuator maximum force. Typical numbers range between 10 to 30%.

This is achieved by continually biasing a control current command output 36 (such as for commanding an electro-hydraulic servo valve (EHSV) or motor torque for example) of every actuator position controller 38 of actuators 20 which are part of one set of actuators so as to balance the measured loads applied by each active actuator 20 on a given steerable wheel 18. The compensation can be considered as being equivalent to a position command bias for aligning the motion and position of any given actuator 20 with that of the other actuator 20 in a set of actuators. As such, the force-fight reduction controller 34 provides an adaptive improvement to the sets of actuators 20. In other words, the force-fight reduction controller 34 acts as a continuous mutual recalibration with one another of both actuators 20 of one set of actuators.

One force-fight reduction controller 34 is associated with every actuator position controller 38 controlling the steering angle of one steerable wheel 18 steered by one set of at least two actuators nominally acting in an All Active configuration. Both the actuator position controller 38 and the force-fight reduction controller 34, for a given actuator 20 or a given set of actuators 20, may be implemented as a pair in their corresponding controller 24. The actuator position controller 38 and the force-fight reduction controller 34 may operate at a sampling frequency which typically ranges between 250 and 500 Hz (i.e. 4 ms and 2 ms sampling period, respectively).

At each computation cycle, the force-fight reduction controller 34 computes and adds a limited-authority compensation to the control current command 36 computed by the actuator position controller 38. The force-fight reduction controller 34 authority is typically limited to approximately +/−20% of control current command 36, while the combined authority of the actuator position controller 38 and force-fight reduction controller 34 is limited to the nominal value of the control current command.

The force-fight reduction controller 34 comprises a force-fight enable logic function 40 and a force-fight compensation function 42. The force-fight enable logic function 40 determines if the force-fight reduction controller 34 supplies a compensation based on availability of the required actuator sensor data and the status of the force-fight reduction controller 34, while the force-fight compensation function computes the value of this compensation. If failure occurs in either one of the first actuator 20c or second actuator 20d connected to one common steerable wheel 18, then the force-fight reduction control function is disactivated since the failed actuator 20 will have been placed in Passive mode by its controller 24.

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description. The invention is defined by the claims that follow.

What is claimed is:

1. An autonomous vehicle comprising:
a body having a passenger compartment;
four steering systems, each steering system comprising:
one of four wheels;
one of four first actuators connecting the one of four wheels to the body for steering the one of four wheels;
one of four second actuators connecting the one of four wheels to the body for steering the one of four wheels; and
one of four controllers each operatively connected to said hia corresponding one of four first actuators of one of the four steering systems and a corresponding one of four second actuators of another one of the four steering systems;
a first power source powering a first subset of the four first actuators and powering a first subset of the four second actuators; and
a second power source powering a second subset of the four first actuators and powering a second subset of the four second actuators.

2. The autonomous vehicle of claim 1, wherein each one of the four second actuators acts on the respective wheel in opposition to the one of four first actuators of the respective steering system.

3. The autonomous vehicle of claim 1, wherein each one of the four second actuators acts on the respective wheel in parallel to the one of four first actuators of the respective steering system.

4. The autonomous vehicle of claim 1, wherein each one of the four first actuators and each one of the second actuators is one of a hydraulic actuator and an electro-mechanical actuator, the first and said second power sources being hydraulic pumps when each of the four first actuators and each of the four second actuators is the hydraulic actuator and the first and second power sources being electrical power sources when each of the four first actuators and each of the four second actuators is the electro-mechanical actuator.

5. The autonomous vehicle of claim 1, wherein the four controllers are organized in two pairs, each pair of controllers controlling two of the four steering systems located at a different end of the body.

6. The autonomous vehicle of claim 1, wherein the controller of each steering system is further connected in active mode to the one of four first actuators of the respective steering system and connected in passive mode to one of the four second actuators of a different one of the four steering systems.

7. The autonomous vehicle of claim 1, wherein the one of four first actuators and the one of four second actuators of each steering system operate in active-active mode, each controller of each steering system further comprising a force-fight compensation system adapted to adjust one of a stroke and a force of at least one of the one of four first actuators and the one of four second actuators of a respective one of the steering systems.

8. The autonomous vehicle of claim 1, wherein the four controllers are high-integrity controllers.

* * * * *

UNITED STATES PATENT AND TRADEMARK OFFICE
CERTIFICATE OF CORRECTION

| | | |
|---|---|---|
| PATENT NO. | : 12,037,058 B2 | Page 1 of 1 |
| APPLICATION NO. | : 17/124585 | |
| DATED | : July 16, 2024 | |
| INVENTOR(S) | : Benoît St-Germain et al. | |

It is certified that error appears in the above-identified patent and that said Letters Patent is hereby corrected as shown below:

In the Claims

Column 10, Lines 8-9, Claim 1, delete "said hia" and insert -- a --

Signed and Sealed this
First Day of October, 2024

Katherine Kelly Vidal
*Director of the United States Patent and Trademark Office*